United States Patent
Wakabayashi et al.

(10) Patent No.: US 9,851,140 B2
(45) Date of Patent: Dec. 26, 2017

(54) DISTILLATION APPARATUS

(71) Applicant: TOYO ENGINEERING CORPORATION, Tokyo (JP)

(72) Inventors: Toshihiro Wakabayashi, Narashino (JP); Takato Nakao, Narashino (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 451 days.

(21) Appl. No.: 14/548,823

(22) Filed: Nov. 20, 2014

(65) Prior Publication Data

US 2015/0143845 A1    May 28, 2015

(30) Foreign Application Priority Data

Nov. 21, 2013  (JP) ................................. 2013-240930

(51) Int. Cl.
*B01D 3/00* (2006.01)
*F25J 1/00* (2006.01)

(52) U.S. Cl.
CPC ............ *F25J 1/0022* (2013.01); *B01D 3/007* (2013.01)

(58) Field of Classification Search
CPC . F25J 1/022; B01D 3/00; B01D 3/007; B01D 3/143
See application file for complete search history.

(56) References Cited

U.S. PATENT DOCUMENTS

| 4,277,268 A * | 7/1981 | Spangler, Jr. ........ B01D 1/2856 203/24 |
| 4,718,986 A | 1/1988 | Comiotto et al. |
| 5,369,975 A | 12/1994 | Matter et al. |
| 5,497,651 A | 3/1996 | Matter et al. |

(Continued)

FOREIGN PATENT DOCUMENTS

| CN | 1063061 A | 7/1992 |
| CN | 101792363 A | 8/2010 |

(Continued)

OTHER PUBLICATIONS

Sulzer Chemtech Ltd., Sulzer Chemtech Distillation and Heat-Pump Tecnology, Production of 1-Butene from Tail Gas of a MTBE Plant.

(Continued)

*Primary Examiner* — Brian McCaig
(74) *Attorney, Agent, or Firm* — Knobbe Martens Olson & Bear LLP

(57) ABSTRACT

A distillation apparatus includes a first distillation column and one or more second distillation columns. A higher-pressure part of the first distillation column includes at least part of a rectifying section, and performs gas-liquid contact at a relatively high pressure. A lower pressure-part of the first distillation column includes at least part of a stripping section and performs gas-liquid contact at a relatively low pressure. A vapor line, which includes a pressurizing means, directs a vapor discharged from a column top of the lower-pressure part to a column bottom of the higher-pressure part.

(Continued)

A liquid line directs a liquid discharged from the column bottom of the higher-pressure part to the column top of the lower pressure part. Corresponding heat exchange structures transfer heat in both directions between the rectifying section of the first distillation column and at least one second distillation column.

5 Claims, 9 Drawing Sheets

(56) References Cited

U.S. PATENT DOCUMENTS

| | | | |
|---|---|---|---|
| 5,783,047 | A | 7/1998 | Aso et al. |
| 2010/0197987 | A1 | 8/2010 | Almering |
| 2012/0125761 | A1 | 5/2012 | Nakaiwa et al. |
| 2013/0213792 | A1 | 8/2013 | Wakabayashi et al. |
| 2013/0220791 | A1 | 8/2013 | Wakabayashi et al. |
| 2013/0247611 | A1 | 9/2013 | Zick |
| 2013/0256115 | A1 | 10/2013 | Wakabayashi et al. |

FOREIGN PATENT DOCUMENTS

| | | |
|---|---|---|
| CN | 102317242 A | 1/2012 |
| CN | 102992933 A | 3/2013 |
| EP | 2628516 A1 | 8/2013 |
| EP | 2631003 A1 | 8/2013 |
| EP | 2644241 A1 | 10/2013 |
| FR | 2959802 A1 | 11/2011 |
| JP | H08-66601 A | 3/1996 |
| JP | 2004-16928 A | 1/2004 |
| JP | 2006-349319 A | 12/2006 |
| WO | 2010/081705 A1 | 7/2010 |
| WO | 2011/043199 A1 | 4/2011 |

OTHER PUBLICATIONS

Office Action dated Jul. 27, 2017 in corresponding CN Application No. 201410675360.1.

* cited by examiner

HP col. : High-Pressure Column
LP col. : Low-Pressure Column
Rect. sec. : Rectifying Section
Str. sec. : Stripping Section HP col. : High-Pressure Column
LP col. : Low-Pressure Column
Rect. sec. : Rectifying Section
Str. sec. : Stripping Section

DISTILLATION APPARATUS

This application is based upon and claims the benefit of priority from Japanese patent application No. 2013-240930, filed on Nov. 21, 2013, the disclosure of which is incorporated herein in its entirety by reference.

BACKGROUND OF THE INVENTION

1. Field of the Invention

The present invention relates to a distillation apparatus including a plurality of distillation columns, and for example, relates to a distillation apparatus including a plurality of distillation columns, suitable for separating a feedstock into three or more fractions by distillation.

2. Description of the Related Art

In a process for separating a feedstock containing multiple components into three or more fractions by distillation, two or more distillation columns are normally used.

For example, there is a process (referred to as a "1-butene process") for separating 1-butene, which is useful as a raw material for linear low density polyethylene (L-LDPE), from a C4 fraction obtained by a steam cracker. In this process, components lighter than 1-butene and components heavier than 1-butene are separated from the C4 fraction to obtain product 1-butene. Note that, in the present description, "C" is used for representing a carbon number. For example, "C4" means that a carbon number is 4. To this end, there has been conventionally known a process in which, by using two conventional distillation columns, the C4 fraction is supplied to a first distillation column, an overhead fraction (containing 1-butene) of the first distillation column is supplied to a second distillation column, and product 1-butene is obtained from the column bottom of the second distillation column as described in the pamphlet "Sulzer Chemtech Distillation and Heat-Pump Technology, Production of 1-Butene from Tail Gas of a MTBE Plant" from Sulzer Chemtech Ltd.

On the other hand, a vapor re-compression system (VRC) is known as a distillation column improved in view of energy saving. In the VRC, an overhead vapor is compressed by a compressor to be increased in temperature, and the resulting fluid is used as a heat source of a reboiler of the VRC. After that, this fluid is decreased in temperature by reducing the pressure, and returned to the column top of the VRC as a reflux. It can be said that, in the VRC, the heat of the column top of one column can be fed to the column bottom of the same column by using a heat pump system. Therefore, the amount of heat supplied at the reboiler can be reduced, and energy consumption in the distillation column can be reduced.

The pamphlet from Sulzer Chemtech discloses, in a process for obtaining 1-butene from the C4 fraction by using two distillation columns, applying the VRC to each of the two distillation columns.

The pamphlet from Sulzer Chemtech also discloses a process described below, regarding the process for obtaining 1-butene from the C4 fraction by using two distillation columns. In this process, the VRC is applied to a first distillation column, and a conventional distillation column is used for a second distillation column. The C4 fraction is supplied to the first distillation column. In this column, 1-butene and a light fraction are discharged from the column top, and this fluid is pressurized and heated by a compressor. The pressurized fluid is divided into two streams, which are supplied to a reboiler of the first distillation column and a reboiler of the second distillation column, respectively, and used as heat sources of the respective reboilers. The two streams that have been used as the reboiler heat sources are joined, cooled and depressurized. The resulting fluid is then supplied to a condenser of the second distillation column, and used for cooling an overhead vapor of the second distillation column. After that, a part of the fluid is refluxed to the first distillation column, and the rest is supplied to the second distillation column as a feedstock.

U.S. Pat. No. 4,718,986 A also discloses a process for obtaining 1-butene from the C4 fraction by using two distillation columns. In this document, the VRC is applied to one of the distillation columns.

In addition to the VRC, a heat integrated distillation column (HIDiC) has been also known as the distillation column improved in view of energy saving, as described in JP H08-66601 A, JP 2004-16928 A and WO 2011/043199. In the HIDiC, by transferring heat from a rectifying section (a section above a feedstock feed position) to a stripping section (a section below the feedstock feed position) of the distillation column by heat exchange, the amount of heat supplied at a reboiler and the amount of heat removed at an overhead condenser are reduced, thereby heat efficiency is improved.

SUMMARY OF THE INVENTION

In the process using two conventional distillation columns (referred to as "first process" herein), a large reboiler load is required in each of the distillation columns, and large amount of energy is consumed. This is particularly noticeable when the relative volatility between a light fraction and a heavy fraction in each of the distillation columns is close to 1.0.

In the process (referred to as "second process" herein) in which the VRC is applied to each of the two distillation columns as described in the pamphlet from Sulzer Chemtech, energy consumption can be significantly reduced as compared with the above-described first process. However, since two compressors are required, the equipment cost may be dramatically increased.

In the process (referred to as "third process" herein) in which the VRC is applied to only one of the two distillation columns as described in the pamphlet from Sulzer Chemtech, only one compressor is used, and therefore, an increase in the equipment cost can be controlled. However, energy consumption cannot be reduced as much as that of the second process.

Accordingly, further improvement is desired for a distillation apparatus that has a plurality of distillation columns in terms of saving energy while controlling the cost increase.

An object of the present invention is to reduce total energy consumption while controlling the cost increase in a distillation apparatus that includes a plurality of distillation columns.

An aspect of the present invention provides a distillation apparatus including a first distillation column and one or more second distillation columns, wherein
the first distillation column includes:
a higher-pressure part including the whole or a part of a rectifying section and configured to perform gas-liquid contact at a relatively high pressure;
a lower-pressure part including the whole or a part of a stripping section and configured to perform gas-liquid contact at a relatively low pressure;

a vapor line that is a line for directing a vapor discharged from a column top of the lower-pressure part to a column bottom of the higher-pressure part and that is equipped with a pressurizing means; and a liquid line that is a line for directing a liquid discharged from the column bottom of the higher-pressure part to the column top of the lower-pressure part, and wherein the distillation apparatus includes:

a first heat exchange structure configured to transfer heat from the rectifying section of the first distillation column to at least one of the one or more second distillation columns by heat exchange; and a second heat exchange structure configured to transfer heat from at least one of the one or more second distillation columns to the stripping section of the first distillation column by heat exchange.

In the above distillation apparatus, a distillation column that receives heat from the rectifying section of the first distillation column via the first heat exchange structure and a distillation column that gives heat to the stripping section of the first distillation column via the second heat exchange structure may be the same distillation column.

The above distillation apparatus may include a line for connecting a column top of the higher-pressure part of the first distillation column or a column bottom of the lower-pressure part of the first distillation column to a feedstock inlet of one of the one or more second distillation columns.

This distillation apparatus may be equipped with a single first distillation column and a single second distillation column, and include a line for connecting the column top of the higher-pressure part of the first distillation column to the feedstock inlet of the second distillation column, and the distillation apparatus may be configured so that a feedstock containing 1-butene, a component(s) lighter than 1-butene, and a component(s) heavier than 1-butene is supplied to the first distillation column, and a fraction enriched in the component(s) heavier than 1-butene is discharged from the column bottom of the lower-pressure part of the first distillation column, and a fraction enriched in 1-butene and the component(s) lighter than 1-butene is discharged from the column top of the higher-pressure part of the first distillation column, and supplied to the second distillation column, and a fraction enriched in 1-butene is discharged from a column bottom of the second distillation column, and a fraction further enriched in the component(s) lighter than 1-butene is discharged from a column top of the second distillation column.

According to present invention, it is possible to reduce total energy consumption while controlling the cost increase in a distillation apparatus that includes a plurality of distillation columns.

DETAILED DESCRIPTION OF THE EXEMPLARY EMBODIMENTS

Figure 1:
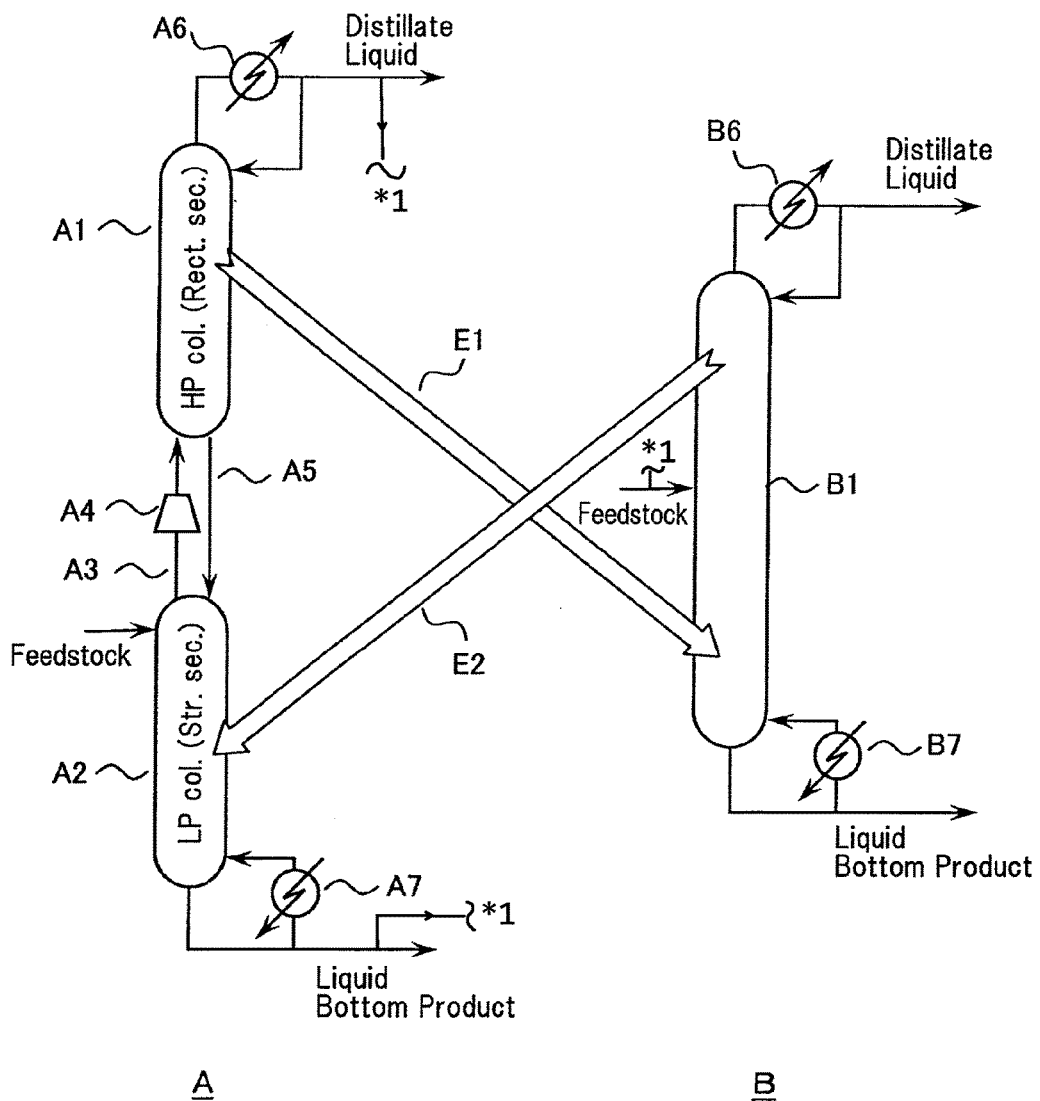
FIG. 1 is a schematic view illustrating an example of a distillation apparatus of the present invention.

In the following, embodiments of the present invention will be described with reference to the drawings, but is not limited thereto.

A distillation apparatus of the present invention includes a first distillation column and a second distillation column. Continuous distillation is carried out in each of the first and second distillation columns.

[First Distillation Column]

The first distillation column includes:

a higher-pressure part including the whole or a part of a rectifying section and configured to perform gas-liquid contact at a relatively high pressure;

a lower-pressure part including the whole or a part of a stripping section and configured to perform gas-liquid contact at a relatively low pressure;

a vapor line, equipped with a pressurizing means, for directing a vapor discharged from a column top of the lower-pressure part to a column bottom of the higher-pressure part; and a liquid line for directing a liquid discharged from the column bottom of the higher-pressure part to the column top of the lower-pressure part.

The Higher-Pressure Part and the Lower-Pressure Part

The terms of the "rectifying section" and the "stripping section" regarding a distillation operation have been used for a long period of time with respect to a distillation apparatus, particularly a continuous distillation apparatus. The rectifying section corresponds to a section located above a feedstock feed position in a conventional distillation column, which is composed of a single column. The stripping section corresponds to a section located below the feedstock feed position in the conventional distillation column. In other words, the rectifying section is a section for increasing the concentration of a light fraction, which is an object to be separated, contained in a feedstock. The stripping section is a section for increasing the concentration of a heavy fraction.

In the present invention, the operating pressure of the higher-pressure part is set to be higher than the operating pressure of the lower-pressure part in order to make the operating temperature of the rectifying section higher than the operating temperature of the stripping section. Here, a "relatively high or low pressure" is based on comparison between the pressures of the lower-pressure part and the higher-pressure part with each other.

The higher-pressure part basically corresponds to the rectifying section and the lower-pressure part basically corresponds to the stripping section. Accordingly, in the most basic configuration of the first distillation column, the higher-pressure part includes the rectifying section but does not include the stripping section, and the lower-pressure part includes the stripping section but does not include the rectifying section. In other words, the higher-pressure part includes the whole of the rectifying section and the lower-pressure part includes the whole of the stripping section. However, the configuration of the first distillation column is not limited to such a configuration. The lower-pressure part may include the whole of the stripping section and also a part of the rectifying section, while the rest of the rectifying section may be included in the higher-pressure part. Alternatively, the higher-pressure part may include the whole of the rectifying section and also a part of the stripping section, while the rest of the stripping section may be included in the lower-pressure part.

In other words, the basic configuration of the first distillation column is a configuration that is obtained by partitioning a conventional distillation column, using a feedstock feed position as a boundary, into two regions (a higher-pressure part including the whole of the rectifying section, and a lower-pressure part including the whole of the stripping section). The configuration of the first distillation column is not, however, limited to this configuration. It is also possible to employ a configuration that is obtained by partitioning a conventional distillation column into two regions at a position above the feedstock feed position, namely, a configuration in which a single column is partitioned (a position located partway along the rectifying section is used as a boundary) into two regions. In this case, one of these two regions corresponds to a lower-pressure part including the whole of the stripping section and a part of the rectifying section, and the other corresponds to a higher-pressure part not including the stripping section but including the rest of the rectifying section. Alternatively, it is possible to employ a configuration that is obtained by partitioning a conventional distillation column into two regions at a position below the feedstock feed position, namely, a configuration in which a single column is partitioned (a position located partway along the stripping section is used as a boundary) into two regions. In this case, one of these two regions corresponds to a higher-pressure part including the whole of the rectifying section and a part of the stripping section, and the other corresponds to a lower-pressure part not including the rectifying section but including the rest of the stripping section.

Naturally, if one of the higher-pressure part and the lower-pressure part includes both the rectifying section and the stripping section, the other never includes both of the rectifying section and the stripping section.

Each of the higher-pressure part and the lower-pressure part is typically formed by a single column (vessel). A high-pressure column forming the higher-pressure part and a low-pressure column forming the lower-pressure part may be provided so as to be spaced from each other. Alternatively, the high-pressure column and the low-pressure column may be integrated with each other to form a single structure. For example, it is possible to divide the inside of a single vessel by a partition wall (a member through which fluid cannot pass) for forming two regions, and to use one of the regions as the high-pressure column and the other as the low-pressure column.

The Vapor Line

In a conventional distillation column, vapor ascends from a lower section (the stripping section) of the column to an upper section (the rectifying section). In the first distillation column used in the present invention, since the stripping section and the rectifying section are basically separated (partitioned), this line is provided for enabling such a stream of the vapor.

This line is provided with a pressurizing means, such as a compressor, for transferring a vapor from the lower-pressure part (having a relatively low pressure) to the higher-pressure part (having a relatively high pressure).

The Liquid Line

In a conventional distillation column, liquid descends from an upper section (the rectifying section) of the column to a lower section (the stripping section). In the first distillation column according to the present invention, since the stripping section and the rectifying section are basically separated (partitioned), this line is provided for enabling such a stream of the liquid. This stream is sometimes referred to as an "intermediate reflux", and this line is sometimes referred to as an "intermediate reflux line".

[Second Distillation Column]

A conventional distillation column may be employed as the second distillation column. The conventional distillation column has a single vessel, and the whole of a rectifying section and the whole of a stripping section exist in a continuous region inside the single vessel. The conventional distillation column does not have a compressor.

An advanced distillation column such as a VRC or a HIDiC may be employed as the second distillation column. However, since a compressor is used for heat utilization in the VRC and the HIDiC, a cost increase is possibly caused. The conventional distillation column is preferable from the viewpoint that the compressor is not required.

As will be described in more detail later, heat is transferred between the first distillation column and the second distillation column according to the present invention. The number of second distillation column(s) that performs heat transfer with a certain single first distillation column may be one, or may be two or more.

[Heat Exchange Structure]

The distillation apparatus of the present invention includes a first heat exchange structure and a second heat exchange structure. The first heat exchange structure is configured to transfer heat by heat exchange from the rectifying section of the first distillation column to at least one of the one or more second distillation columns. The second heat exchange structure is configured to transfer heat by heat exchange from at least one of the one or more second distillation columns to the stripping section of the first distillation column. Note that, in the present description, the term "heat exchange" more precisely means indirect heat exchange, unless otherwise noted.

Each heat exchange structure can be formed by using a heat exchanger and piping and the like. For example, each of the first heat exchange structure and the second heat exchange structure can be formed by using a heat exchanger provided in one of the first and second distillation columns, and a line for withdrawing a fluid from the other distillation column, passing the fluid through this heat exchanger, and returning the fluid to the other distillation column.

For example, the heat exchange structure can include at least one of the configurations described in the following a) to d). The following a) and b) correspond to first heat exchange structure E1 described in detail later, and the following c) and d) correspond to second heat exchange structure E2 described in detail later:

a) a heat exchanger provided in the rectifying section of the first distillation column (typically, the rectifying section included in the higher-pressure part), and a line for withdrawing a liquid from the second distillation column (typically, the stripping section thereof), passing the liquid through this heat exchanger, and returning the resulting fluid to the second distillation column (typically, the stripping section thereof);

b) a heat exchanger provided in the second distillation column (typically, the stripping section thereof), and a line for withdrawing a vapor from the rectifying section of the first distillation column (typically, the rectifying section included in the higher-pressure part), passing the vapor through this heat exchanger, and returning the resulting fluid to the rectifying section of the first distillation column (typically, the rectifying section included in the higher-pressure part);

c) a heat exchanger provided in the stripping section of the first distillation column (typically, the stripping section included in the lower-pressure part), and a line for withdrawing a vapor from the second distillation column (typically, the rectifying section thereof), passing the vapor through this heat exchanger, and returning the resulting fluid to the second distillation column (typically, the rectifying section thereof); and d) a heat exchanger provided in the second distillation column (typically, the rectifying section thereof), and a line for withdrawing a liquid from the stripping section of the first distillation column (typically, the stripping section included in the lower-pressure part), passing the liquid through this heat exchanger, and returning the resulting fluid to the stripping section of the first distillation column (typically, the stripping section included in the lower-pressure part).

Alternatively, it is possible to employ a structure in which a heat exchanger is provided outside the first distillation column and outside the second distillation column, a fluid to be heat-exchanged is withdrawn from the first distillation column and returned via this heat exchanger to the first distillation column, and a fluid to be heat-exchanged is withdrawn from the second distillation column and returned via this heat exchanger to the second distillation column.

The first heat exchange structure may be any structure as long as heat can be transferred ultimately from the rectifying section of the first distillation column to the second distillation column. Therefore, the first heat exchange structure can be realized without directly using any of a fluid present within the rectifying section of the first distillation column and a fluid present within the second distillation column. For example, a fluid discharged from the rectifying section of the first distillation column can be used in place of a fluid present within the rectifying section of the first distillation column. Besides, a fluid which is to be fed into the second distillation column can be used in place of a fluid present within the second distillation column. For example, by exchanging heat between a feedstock which is to be fed into the second distillation column and an overhead vapor withdrawn from the column top of the rectifying section of the first distillation column (typically, the rectifying section included in the higher-pressure part), heat can be transferred from the rectifying section of the first distillation column to the second distillation column.

Here, discussion will be made on a configuration in which the lower-pressure part includes the whole of the stripping section and a part of the rectifying section and the higher-pressure part includes a part of the rectifying section, in the first distillation column. This configuration includes, for example, an embodiment in which the first distillation column includes a low-pressure column and a high-pressure column, the low-pressure column includes, above the stripping section, a part of the rectifying section, and the high-pressure column includes the rest of the rectifying section. In such a configuration, a fluid discharged from the column top of the low-pressure column (a fluid discharged from the rectifying section included in the low-pressure column) can be transferred to the column bottom of the high-pressure column via a compressor, and in this case, heat of the compressor outlet fluid can be given to a fluid present within the second distillation column (particularly, the stripping section thereof) by heat exchange. For example, a heat exchange structure may be provided within the second distillation column (particularly, the stripping section thereof) (for example, at a stage directly above the column bottom of the second distillation column), and the fluid discharged from the column top of the low-pressure column can be supplied to the column bottom of the high-pressure column via the compressor and this heat exchange structure. By such heat exchange, heat can be transferred from the rectifying section included in the low-pressure column of the first distillation column to the second distillation column (particularly, the stripping section thereof).

In these embodiments of the heat exchange, heat exchange is performed between a process fluid of one of the distillation columns and a process fluid of the other. However, it is also possible to employ an embodiment in which heat exchange is performed via a fluid other than these fluids (for example, via a heating medium different from any of the process fluids).

Also, the second heat exchange structure may be any structure as long as heat can be transferred ultimately from the second distillation column to the striping section of the first distillation column (typically, the stripping section included in the lower-pressure part).

Naturally, in any case, a fluid giving heat has a higher temperature than a fluid receiving heat. The first distillation column and the second distillation column are selected and the pressures of the rectifying section and the stripping section of the first distillation column are set so as to enable the heat transfer described above.

A single heat exchange structure may be employed, or a plurality of heat exchange structures may be employed as the first heat exchange structure. Also, a single heat exchange structure may be employed, or a plurality of heat exchange structures may be employed as the second heat exchange structure.

[Configuration Example of the Distillation Apparatus]

FIG. 1 schematically shows an example of the configuration of the distillation apparatus of the present invention. The distillation apparatus is provided with a single first distillation column A and a single second distillation column B. Distillation column A includes high-pressure column A1 as the higher-pressure part, and low-pressure column A2 as the lower-pressure part.

A feedstock is supplied to the column top of low-pressure column A2.

The operating pressure of high-pressure column A1 is higher than the operating pressure of low-pressure column A2. To this end, pressurizing means A4, such as a compressor, is provided in vapor line A3. A vapor discharged from the column top of low-pressure column A2 is pressurized by pressurizing means A4, and supplied to the column bottom of high-pressure column A1. A liquid discharged from the column bottom of high-pressure column A1 is supplied to the column top of low-pressure column A2. The liquid discharged from the column bottom of high-pressure column A1 may be reduced in pressure by a pressure reducing means, such as a pressure reducing valve, and then supplied to the column top of low-pressure column A2, as necessary. A pump for transferring liquid can be used, as necessary, in such a case where the liquid cannot be transferred to the low-pressure column from the high-pressure column only by the difference in operating pressure between the high-pressure column and the low-pressure column due to a pressure loss in the piping or an elevation difference. The reason why the operating pressure of high-pressure column A1 is made higher than the operating pressure of low-pressure column A2 is to make the operating temperature of the high-pressure column (particularly, the rectifying section included in the high-pressure column) higher than the operating temperature of the low-pressure column (particularly, the stripping section included in the low-pressure column) or the stripping section of second distillation column B that will be described later.

A vapor discharged from the column top of high-pressure column A1 is cooled in overhead condenser A6, or cooled by a fluid of the stripping section of second distillation column B, and at least partially condensed. A part of the condensed liquid is refluxed to the high-pressure column, and the rest of the condensed liquid (which may be accompanied by a vapor not condensed) is discharged from distillation column A as a distillate liquid.

A part of a liquid discharged from the column bottom of low-pressure column A2 is heated in reboiler A7, or heated by a fluid of the rectifying section of second distillation column B, at least partially vaporized, and returned to the low-pressure column. The rest of the liquid discharged from the column bottom of the low-pressure column is discharged from distillation column A as a liquid bottom product.

Second distillation column B includes column body (vessel) B1, overhead condenser B6, and reboiler B7.

A vapor discharged from the column top of distillation column B is cooled in overhead condenser B6, and at least partially condensed. A part of the condensed liquid is refluxed to distillation column B, and the rest of the condensed liquid (which may be accompanied by a vapor not condensed) is discharged from distillation column B as a distillate liquid.

A part of a liquid discharged from the column bottom of distillation column B is heated in reboiler B7, at least partially vaporized, and returned to distillation column B. The rest of the liquid discharged from the column bottom of distillation column B is discharged from distillation column B as a liquid bottom product.

For each of the configurations around overhead condensers A6 and B6 and the configurations around reboilers A7 and B7, a configuration applied to a conventionally-known distillation column can be employed. For example, a gas-liquid separation drum (not shown) may be provided downstream of the overhead condenser, as necessary.

In the apparatus shown in FIG. 1, a second distillation column that performs heat exchange with the rectifying section of the first distillation column and a second distillation column that performs heat exchange with the stripping section of the first distillation column are the same distillation column. First heat exchange structure E1 is configured to transfer heat from the rectifying section of distillation column A to distillation column B, and second heat exchange structure E2 is configured to transfer heat from distillation column B to the stripping section of distillation column A. In FIG. 1, the detailed structures of heat exchange structures E1 and E2 are not shown, while heat transfers are conceptually shown by outlined arrows.

The fluid present within the rectifying section of distillation column A is cooled by heat exchange structure E1. The fluid present within the stripping section of distillation column A is heated by heat exchange structure E2. On the other hand, the fluid present within distillation column B, preferably, the fluid present within the rectifying section of distillation column B is cooled by heat exchange structure E2. The fluid present within distillation column B, preferably, the fluid present within the stripping section of distillation column B is heated by heat exchange structure E1.

In other words, first heat exchange structure E1 functions as a side cooler provided in the rectifying section of distillation column A, and also functions as a side reboiler provided in distillation column B. Second heat exchange structure E2 functions as a side reboiler provided in the stripping section of distillation column A, and also functions as a side cooler provided in distillation column B.

According to the above-described configuration, heat can be transferred from the rectifying section of distillation column A to the stripping section of distillation column B, and heat can be transferred from the rectifying section of distillation column B to the stripping section of distillation column A.

Heat loads on overhead condenser A6 and reboiler A7 of distillation column A, and also heat loads on overhead condenser B6 and reboiler B7 of distillation column B are reduced by the first and second heat exchange structures. As a result, energy consumption in the distillation apparatus can be reduced. Moreover, since it is not necessary to use a plurality of compressors, the cost increase can be controlled.

In this distillation apparatus, the position heated by heat exchange structure E1 (the stripping section of distillation column B) is located below the position cooled by heat exchange structure E2 (the rectifying section of distillation column B). Since the rectifying section and the stripping section of distillation column B exist in a continuous region within the single vessel, the lower position has a higher temperature. Therefore, the temperature of the position heated by heat exchange structure E1 is higher than the temperature of the position cooled by heat exchange structure E2. As a result, regarding the temperatures of the respective positions where heat exchange is performed, the temperature of the position cooled by heat exchange structure E1 (high-pressure column A1) is highest, the temperature of the position heated by heat exchange structure E1 (the stripping section of distillation column B) is next highest, the temperature of the position cooled by heat exchange structure E2 (the rectifying section of distillation column B) is next highest, and the temperature of the position heated by heat exchange structure E2 is lowest.

It can be said that, in this distillation apparatus, heat can be transferred from the rectifying section of first distillation column A to the stripping section of first distillation column A via heat exchange structure E1, the second distillation column, and heat exchange structure E2.

Figure 2:
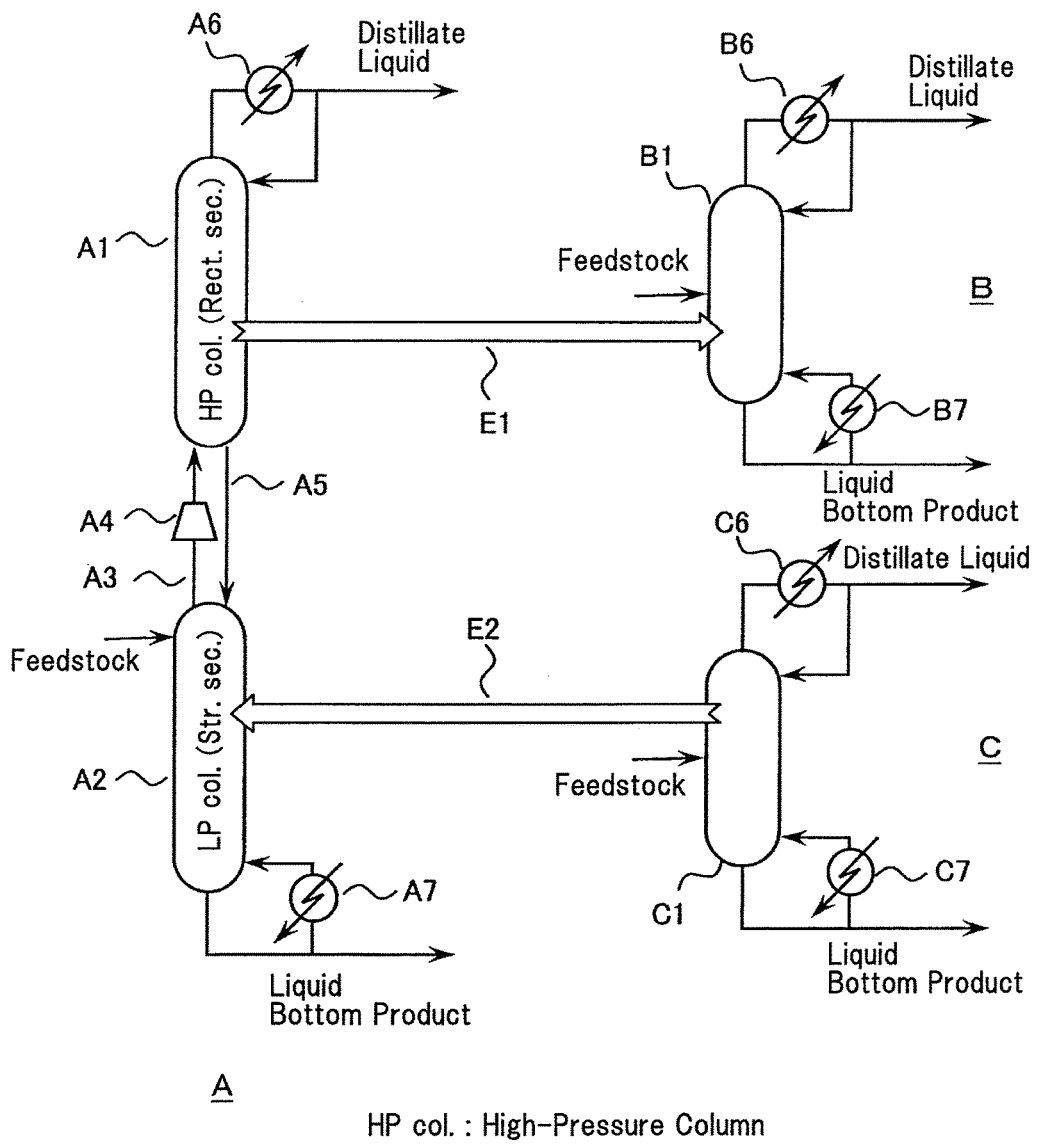
FIG. 2 is a schematic view illustrating another example of the distillation apparatus of the present invention.

FIG. 2 shows another example of the distillation apparatus according to the present invention. In this example, two distillation columns B and C are used as the second distillation column. A conventional distillation column is preferably employed as each of distillation columns B and C from the viewpoint that a compressor for heat utilization is not required. First distillation column A included in this distillation apparatus basically has the same configuration as first distillation column A shown in FIG. 1. However, the second distillation column with which the first distillation column performs heat exchange is different from that of the apparatus shown in FIG. 1.

Second distillation columns B and C included in this distillation apparatus include column bodies (vessels) B1 and C1, overhead condensers B6 and C6, and reboilers B7 and C7 similarly to the second distillation column shown in FIG. 1.

Heat is transferred by heat exchange from the rectifying section of first distillation column A (typically, the rectifying section included in high-pressure column A1) to second distillation column B (particularly, the stripping section thereof) by first heat exchange structure E1. Heat is transferred by heat exchange from second distillation column C (particularly, the rectifying section thereof) to the stripping section of first distillation column A (typically, the stripping section included in low-pressure column A2) by second heat exchange structure E2.

In the apparatus shown in FIG. 2, first heat exchange structure E1 functions as a side cooler provided in high-pressure column A1 included in the first distillation column (typically, the rectifying section thereof), and also functions as a side reboiler provided in second distillation column B (particularly, the stripping section thereof). Second heat exchange structure E2 functions as a side reboiler provided in the low-pressure column included in the first distillation column (typically, the stripping section thereof), and also functions as a side cooler provided in second distillation column C (particularly, the rectifying section thereof).

As a result, in this apparatus, heat loads on overhead condenser A6 and reboiler A7 can be reduced. Heat loads on reboiler B7 of distillation column B and overhead condenser C6 of distillation column C can be also reduced. Consequently, energy consumption in the distillation apparatus shown in FIG. 2 is reduced. Moreover, since it is not necessary to use a plurality of compressors, the cost increase can be controlled.

Furthermore, as a variant of the embodiment in which a plurality of second distillation columns (distillation columns that perform heat exchange with the first distillation column) exist with respect to a single first distillation column as shown in FIG. 2, the following embodiment may be employed. That is, for example, when there exist two second distillation columns B and C, heat exchange structures E1 and E2 are provided between first distillation column A and second distillation column B, and other heat exchange structures E1 and E2 are also provided between first distillation column A and second distillation column C. Accordingly, heat is transferred from the rectifying section of distillation column A to distillation column B (particularly, the stripping section thereof), and heat is transferred from distillation column B (particularly, the rectifying section thereof) to the stripping section of distillation column A. Besides, heat is transferred from the rectifying section of distillation column A to distillation column C (particularly, the stripping section thereof), and heat is transferred from distillation column C (particularly, the rectifying section thereof) to the stripping section of distillation column A. That is, both the first and second heat exchange structures can be provided for each of the plurality of second distillation columns.

[Connection Between the First and Second Distillation Columns]

The first distillation column and the second distillation column may be connected in series. For example, in the distillation apparatus shown in FIG. 1, a part or the whole of the distillate liquid of first distillation column A may be supplied to second distillation column B as a feedstock. Alternatively, a part or the whole of the liquid bottom product of first distillation column A may be supplied to second distillation column B as a feedstock. In such a way, distillation column A and distillation column B can be connected in series in this order.

Alternatively, a part or the whole of the distillate liquid of second distillation column B may be supplied to first distillation column A as a feedstock, or a part or the whole of the liquid bottom product of second distillation column B may be supplied to first distillation column A as a feedstock. In such a way, distillation column B and distillation column A can be connected in series in this order.

To enable such connection, there may be provided a line for connecting the column top of high-pressure column A1 of the first distillation column or the column bottom of low-pressure column A2 of the first distillation column to a feedstock inlet of distillation column B in the apparatus shown in FIG. 1. In the distillation apparatus shown in FIG. 2, two or three distillation columns selected from distillation columns A, B, and C may be connected in series.

To enable such connection, there may be provided, for example, a line for connecting the column top of high-pressure column A1 of the first distillation column or the column bottom of low-pressure column A2 of the first distillation column to a feedstock inlet of second distillation column B or a feedstock inlet of second distillation column C in the apparatus shown in FIG. 2.

However, it is not necessary to arrange the first distillation column and the second distillation column in series. The first and second distillation columns may be arranged in parallel. Alternatively, the first distillation column and the second distillation column may not have any relation between them except for the heat transfer.

[1-Butene Process]

The distillation apparatus of the present invention can be applied to a 1-butene process. In this case, the following process can be employed. That is, a feedstock containing 1-butene, components lighter than 1-butene, and components heavier than 1-butene (e.g., a C4 fraction obtained from a steam cracker) is supplied to the first distillation column. A fraction enriched in the components heavier than 1-butene is discharged from the column bottom of the lower-pressure part of the first distillation column. A fraction enriched in 1-butene and the components lighter than 1-butene is discharged from the column top of the higher-pressure part of the first distillation column, and supplied to the second distillation column. A fraction enriched in 1-butene (product 1-butene) is discharged from the column bottom of the second distillation column. A fraction further enriched in the components lighter than 1-butene is discharged from the column top of the second distillation column.

This process can be performed by connecting the line through which the distillate liquid of first distillation column A is discharged to the feedstock inlet of second distillation column B in the distillation apparatus shown in FIG. 1.

[Detailed Heat Exchange Structure]

A First Detailed Example

The heat exchange structure as described in the above-described a) or d), that is, the heat exchange structure configured to withdraw a liquid from a certain column, pass the liquid through a heat exchanger, and return the resulting fluid to the same column may include, for example, the following elements:

a heat exchanger located at a certain stage of one (referred to as "distillation column X") of the first and second distillation columns;

a liquid withdrawal unit located at a certain stage of the other (referred to as "distillation column Y") of the first and second distillation column and configured to withdraw a part of liquid from this stage to the outside of the column;

a pipe (a first pipe) for introducing the liquid from the liquid withdrawal unit to this heat exchanger; and a pipe (a second pipe) for introducing, to a stage directly below the liquid withdrawal unit of distillation column Y, a fluid introduced through the first pipe to this heat exchanger and then discharged from this heat exchanger.

Figure 3:
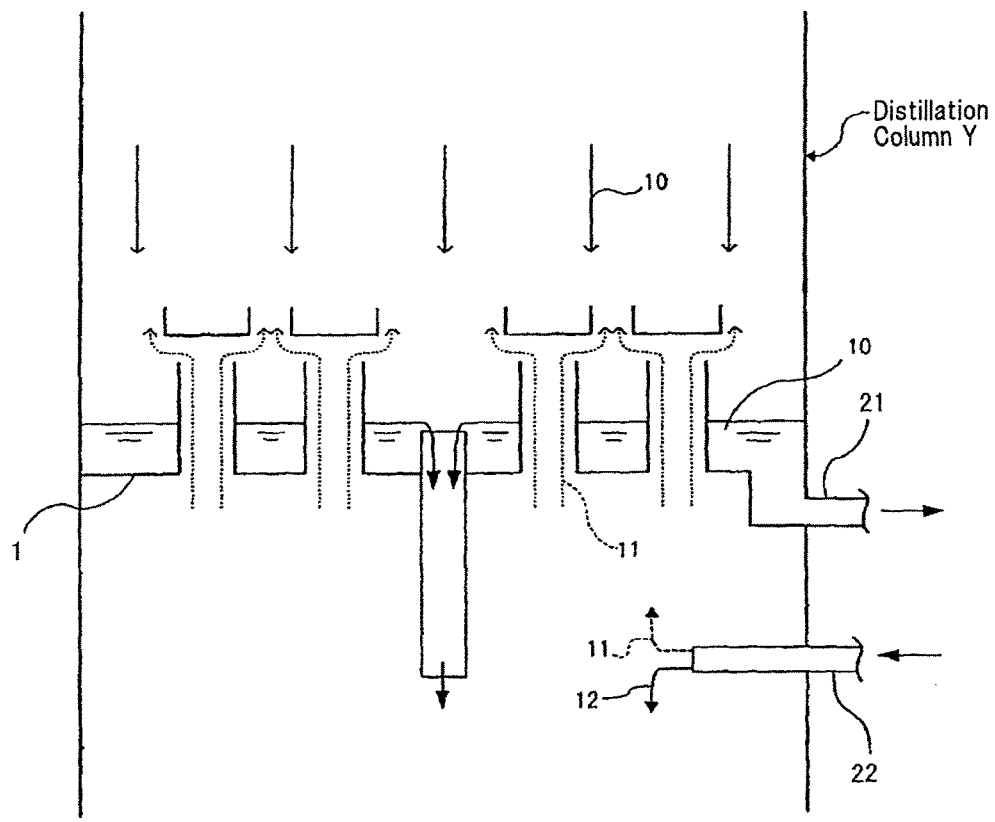
FIG. 3 is a view for explaining a detailed example of a heat exchange structure.

These elements will be described with reference to FIGS. 3 and 4. As shown in FIG. 3, the liquid withdrawal unit provided in distillation column Y holds liquid 10, which has descended from an upper part of distillation column Y, on chimney tray for sump 1, and withdraws a part of liquid 10 to the outside of this column. Pipe 21 (the first pipe) for directing the part of liquid 10 to the heat exchanger provided in distillation column X is connected to the liquid withdrawal unit. Pipe 22 (the second pipe) from this heat exchanger is inserted through a shell wall of distillation column Y into a stage directly below the liquid withdrawal unit. From pipe 22 inserted into the stage directly below the liquid withdrawal unit (a stage directly below the chimney tray for sump), a fluid which is a mixture of vapor 11 and liquid 12 as described below is fed, and vapor 11 ascends while liquid 12 descends. The liquid withdrawal unit includes chimney tray for sump 1, and a connection port, which is provided on the shell wall of distillation column Y, to be connected with the first pipe.

Figure 4:
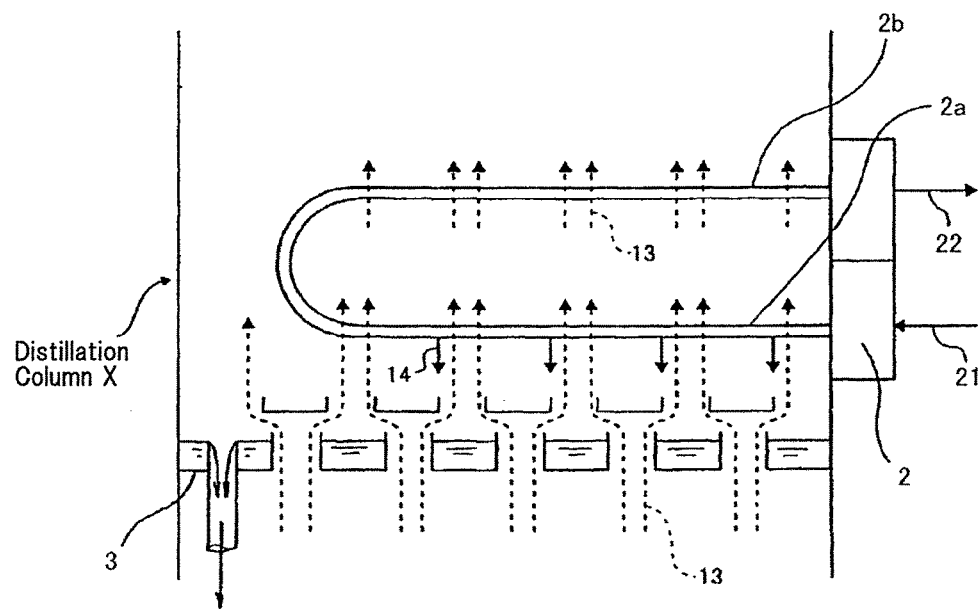
FIG. 4 is a view for explaining the detailed example of the heat exchange structure.

As shown in FIG. 4, tube-bundle-type heat exchanger 2 is inserted into a certain stage of distillation column X. The parallel tube portions in the U-shaped tube of tube-bundle-type heat exchanger 2 are placed along chimney tray for sump 3 for temporarily holding a condensed liquid and for re-distributing vapor ascending from below. Lower tube portion 2a of the parallel tube portions is connected to pipe 21 (the first pipe) that is connected to the liquid withdrawal unit of distillation column Y. Upper tube portion 2b is connected to pipe 22 (the second pipe) that is inserted into the stage directly below the liquid withdrawal unit.

An operation of tube-bundle-type heat exchanger 2 will now be described. Vapor 13 (refer to FIG. 4) ascending inside distillation column X comes into contact with the U-shaped tube of tube-bundle-type heat exchanger 2. A liquid at the certain stage of distillation column Y is introduced through pipe 21 to lower tube portion 2a of heat exchanger 2. Thus, the liquid within tube portion 2a is heated by the heat of vapor 13, and a part of vapor 13 in contact with tube portion 2a becomes liquid 14, and this liquid descends. Upper tube portion 2b of heat exchanger 2 is also heated by the heat of vapor 13. Thus, the liquid introduced through pipe 21 into heat exchanger 2 changes into a fluid which is a mixture of a liquid phase and a gas phase while the liquid moves through lower tube portion 2a and then through upper tube portion 2b. This fluid then passes through pipe 22 located outside the column to be introduced to the stage directly below the liquid withdrawal unit (chimney tray for sump 1) of distillation column Y (refer to FIG. 3).

When the liquid withdrawal unit of distillation column Y is located at a position vertically higher than the heat exchanger of distillation column X, any pressure-feeding means such as a pump is not needed to circulate such fluids because the configuration described herein employs the thermo-siphon system. In other words, because the liquid withdrawal unit of distillation column Y is connected to lower tube portion 2a of heat exchanger 2 of distillation column X via pipe 21 and because upper tube portion 2b of heat exchanger 2 of distillation column X is connected to the stage directly below the liquid withdrawal unit (chimney tray for sump 1) of distillation column Y via pipe 22, the liquid descends from distillation column Y to distillation column X by gravity, which causes the above-mentioned fluid to flow from distillation column X to distillation column Y even if no pump is provided.

A Second Detailed Example

The heat exchange structure as described in the above b) or c), that is, the heat exchange structure configured to withdraw a vapor from a certain column, pass the vapor through a heat exchanger, and return the resulting fluid to the same column may include, for example, the following elements:

a liquid sump unit located at a certain stage of one (referred to as "distillation column V") of the first and second distillation columns and configured to hold liquid that has flowed downward;

a heat exchanger located in the liquid sump unit;

a partition plate that is set in the other (referred to as "distillation column W") of the first and second distillation columns and that is configured for complete partition of upper and lower stages;

a pipe (a third pipe) for introducing vapor below the partition plate to this heat exchanger; and a pipe (a fourth pipe) for introducing, to an upper side of the partition plate, a fluid introduced through the third pipe to this heat exchanger and then discharged from this heat exchanger.

Figure 5:
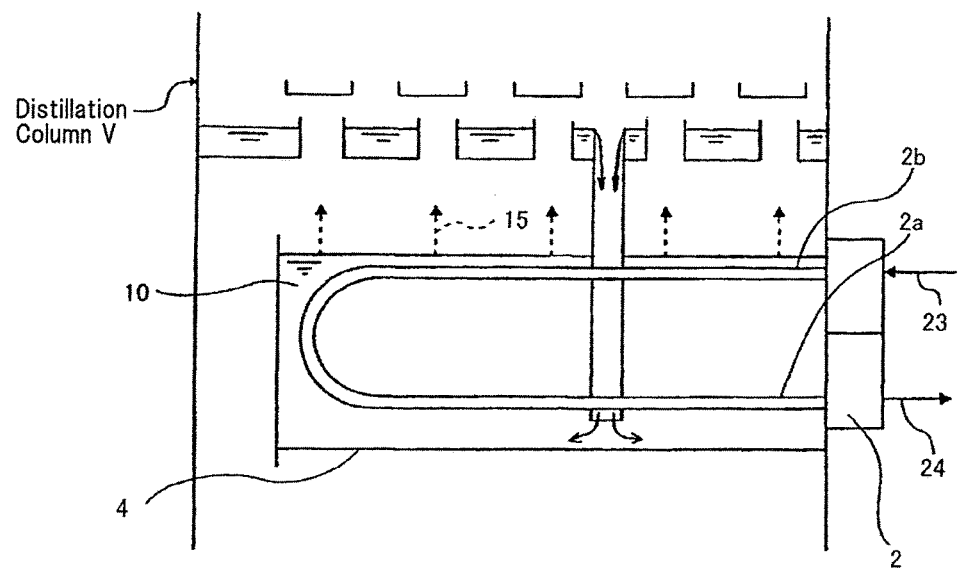
FIG. 5 is a view for explaining another detailed example of the heat exchange structure.

These elements will be described with reference to FIG. 5. The liquid sump unit provided at the certain stage of distillation column V can store a predetermined amount of liquid 10 that has flowed down onto chimney tray for sump 4, and can drop liquid spilled from chimney tray for sump 4. Tube-bundle type heat exchanger 2 is inserted into the liquid sump unit, so that the U-shaped tube of tube-bundle-type heat exchanger 2 can be dipped in the liquid stored in the liquid sump unit. Parallel tube portions 2a and 2b in the U-shaped tube of tube-bundle-type heat exchanger 2 are placed along chimney tray for sump 4.

Pipe 23 for transferring a fluid from distillation column W to distillation column V is connected to upper tube portion 2b of the parallel tube portions. Pipe 24 for transferring a fluid from distillation column V to distillation column W is connected to lower tube portion 2a. An operation of heat exchanger 2 in the liquid sump unit will now be described. Liquid descends from the column top of distillation column V through a tray or a packed layer. Liquid 10 stays at the liquid sump unit on chimney tray for sump 4 that is located at an arbitrary stage. The U-shaped tube of tube-bundle-type heat exchanger 2 is placed in the liquid sump unit, and hence the U-shaped tube is dipped in liquid 10. In this state, when high-temperature vapor present within distillation column W is introduced through pipe 23 into upper tube portion 2b of heat exchanger 2, a part of liquid 10 in contact with the outer wall of tube portions 2b and 2a, through which the high-temperature vapor moves, is heated to become vapor 15 and ascends. Furthermore, the high-temperature vapor having been introduced from pipe 23 into heat exchanger 2 changes into a fluid which is a mixture of a liquid phase and a gas phase, or a liquid, while the vapor moves through upper tube portion 2b and then through lower tube portion 2a. This fluid then passes through the pipe located outside the column to be introduced to a stage above the partition plate of distillation column W described later. A region above the partition plate in distillation column W is set to have a lower operating pressure than a region below the partition plate, and the fluid is circulated by this pressure difference. When the heat exchanger of distillation column V is located at a position vertically higher than the partition plate of distillation column W, any pressure-feeding means such as a pump is not needed for such fluid circulation.

In other words, because the certain stage of distillation column W is connected to upper tube portion 2b of heat exchanger 2 in distillation column V via pipe 23 and because lower tube portion 2a of heat exchanger 2 in distillation column V is connected to the above-mentioned stage of distillation column W via pipe 24, higher-pressure vapor present in distillation column W ascends toward heat exchanger 2 in distillation column V through pipe 23 owing to the pressure difference between the regions below and above the partition plate of distillation column W. As a result, the liquid condensed from the vapor within heat exchanger 2 is then pushed out of distillation column V to pipe 24 located outside the column, and then descends to distillation column W by gravity. Thus, any pressure-feeding means such as a pump is not necessary.

Distillation column W is completely partitioned into upper and lower stages by the partition plate at a position located partway. The stage directly below the partition plate communicates with pipe 23. Ascending vapor in this stage is transferred, through pipe 23, to upper tube portion 2b of heat exchanger 2 placed in the liquid sump unit of distillation column V. Into the upper stage of the partition plate, pipe 24 from distillation column V is inserted through the shell wall of distillation column W. A fluid which is a mixture of vapor and liquid is introduced into the upper stage of the partition plate through pipe 24, and the vapor ascends while the liquid descends to stay on the partition plate within distillation column W. Furthermore, the two stages vertically adjacent to each other with the partition plate sandwiched therebetween can communicate with each other through a pipe having a control valve. The liquid held on the partition plate is fed to the stage below the partition plate by an operation of opening the control valve when appropriate.

EXAMPLES

In the following, the present invention will be described in more detail based on examples, but is not limited thereto.

Example 1

Figure 6:
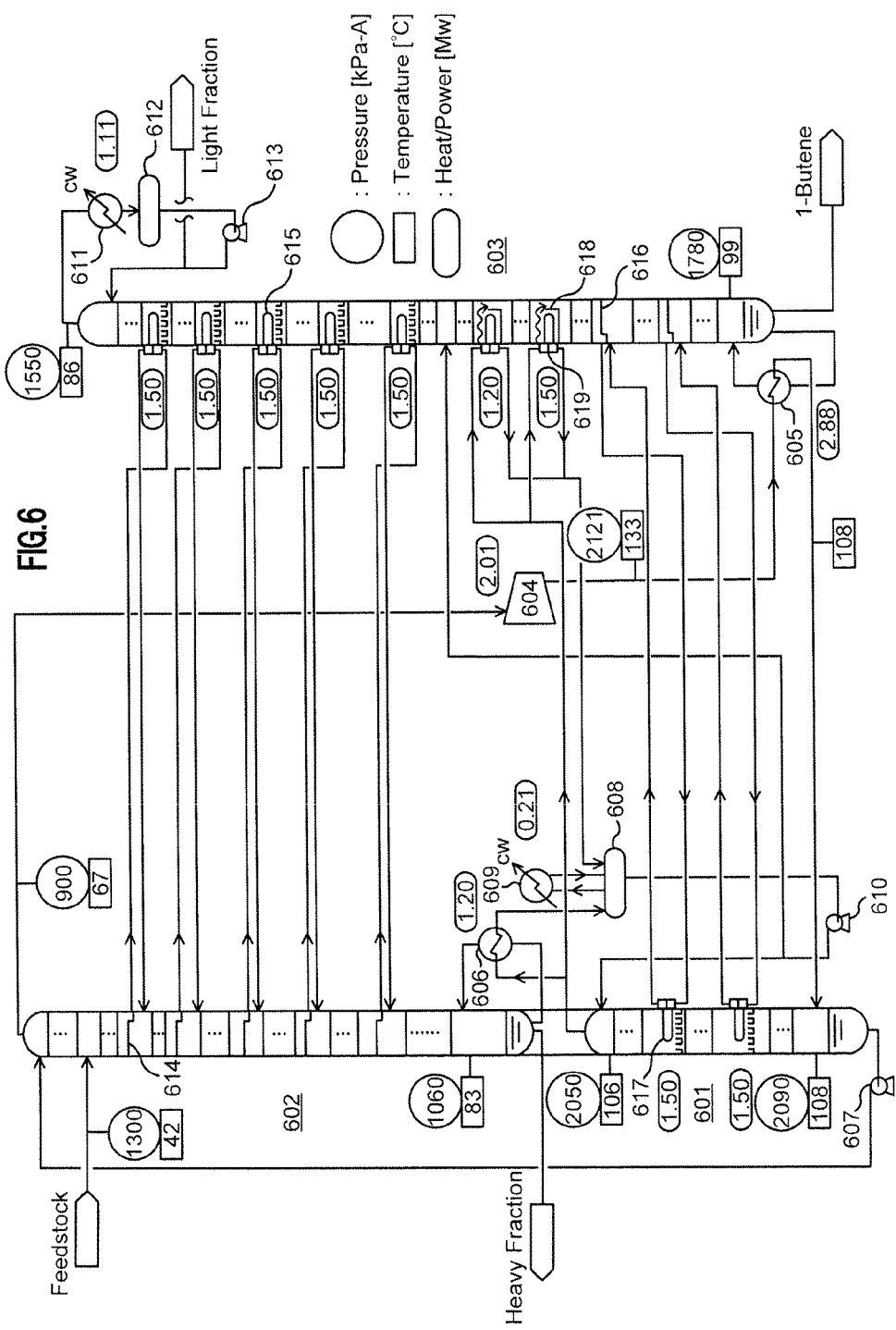
FIG. 6 is a process flow diagram of Example 1.

Heat and material balance was calculated for the 1-butene process to which the distillation apparatus according to the present invention is applied. FIG. 6 shows the process flow. In FIG. 6, pressures (kPaA), temperatures (° C.), heat loads (exchanged heat or power) (MW) are shown. The pressures are shown in circles, the temperatures are shown in rectangles, and the heat loads are shown in elongated circles. The letter "A" in the pressure unit "kPaA" means an absolute pressure. The same applies to FIGS. 7 to 9.

This distillation apparatus corresponds to the distillation apparatus shown in FIG. 1. The first distillation column (corresponding to distillation column A shown in FIG. 1) includes high-pressure column 601 (corresponding to high-pressure column A1 shown in FIG. 1) and low-pressure column 602 (corresponding to low-pressure column A2 in FIG. 1). Distillation column 603 is the second distillation column (corresponding to distillation column B shown in FIG. 1). High-pressure column 601 is installed vertically below low-pressure column 602.

A feedstock (the flow rate and the composition are shown in Table 1) is supplied to a stage located partway along low-pressure column 602 (a stage close to the column top) at 1300 kPaA and 42° C. In low-pressure column 602, a section below the feedstock feed position is the stripping section of the first distillation column, and a section above the feedstock feed position is a part of the rectifying section of the first distillation column. The rest of the rectifying section of the first distillation column is included in high-pressure column 601. In Table 1, C1 indicates a hydrocarbon component having 1 carbon atom, and C3 indicates hydrocarbon components having 3 carbon atoms.

A vapor (900 kPaA, 67° C.) is withdrawn from the column top of low-pressure column 602, pressurized and simultaneously increased in temperature (2121 kPaA, 133° C.) by compressor 604 (corresponding to pressurizing means A4 shown in FIG. 1), cooled to 108° C. by heat exchanger 605, and supplied to the column bottom (2090 kPaA, 108° C.) of high-pressure column 601. A part of a liquid withdrawn from the column bottom (1060 kPaA, 83° C.) of low-pressure column 602 is discharged from the distillation apparatus as a heavy fraction (the flow rate and the composition are shown in Table 1), and the rest is heated by heat exchanger (reboiler) 606, and returned to the column bottom of the low-pressure column. The operating temperature of the high-pressure column is made higher than the operating temperature of the low-pressure column by compression in compressor 604.

A liquid withdrawn from the column bottom of high-pressure column 601 is supplied to the column top of low-pressure column 602 via pump 607. Pump 607 is provided for transferring liquid from a low position to a high position, as necessary.

A part of a vapor withdrawn from the column top (2050 kPaA, 106° C.) of the high-pressure column is supplied to heat exchanger 606, cooled therein, and transferred to reflux drum 608. The rest of the vapor withdrawn from the column top of the high-pressure column is divided into two streams, which are respectively cooled in two heat exchangers 619 provided in distillation column 603, and transferred to drum 608.

Heat exchanger 606 functions as an overhead condenser of the first distillation column, and also functions as a reboiler of the first distillation column. Accordingly, heat transfer from the rectifying section to the stripping section in the first distillation column is achieved. Although the heat exchange as described above may be performed in the first distillation column, it is not always necessary to perform this heat exchange.

In gas-liquid separation drum 608, heat exchanger 609 is provided as an auxiliary overhead condenser. In heat exchanger 609, cooling water is used as a cooling medium (CW in the drawings denotes the cooling water). A vapor is transferred to auxiliary overhead condenser 609 from drum 608, cooled and condensed, and returned to drum 608. A liquid from drum 608 is transferred to pump 610. A part of the outlet liquid of pump 610 is returned to the column top of high-pressure column 601 as a reflux. The rest of the outlet liquid of pump 610 is supplied to distillation column 603 (as a feedstock for distillation column 603).

A vapor withdrawn from the column top (1550 kPaA, 86° C.) of distillation column 603 is cooled and fully condensed in overhead condenser 611, and transferred to gas-liquid separation drum 612. Cooling water is used as a cooling medium also in condenser 611. A part of the liquid from drum 612 is returned via pump 613 to the column top of distillation column 603 as a reflux. The rest is discharged from the distillation apparatus as a light fraction (the flow rate and the composition are shown in Table 1).

A part of a liquid withdrawn from the column bottom (1780 kPaA, 99° C.) of distillation column 603 is transferred to heat exchanger 605, and the rest is discharged from the distillation column as product 1-butene (the flow rate and the composition are shown in Table 1). The liquid transferred to heat exchanger 605 is heated in this heat exchanger, and returned to the column bottom of distillation column 603. Heat exchanger 605 functions as a reboiler of distillation column 603.

Liquid withdrawal units 614 are provided respectively at five stages of low-pressure column 602 (particularly, the stripping section of the first distillation column included in the low-pressure column) as described in detail in the first detailed example of the heat exchange structure. Tube-bundle-type heat exchangers 615 are also provided respectively corresponding to the liquid withdrawal units within distillation column 603 (particularly, the rectifying section thereof). Liquids are withdrawn from respective liquid withdrawal units 614, heated in corresponding heat exchangers 615, and returned to stages directly below respective liquid withdrawal units 614. Liquid withdrawal units 614, lines for transferring the liquids from the liquid withdrawal units to heat exchangers 615, heat exchangers 615, and lines for returning the fluids to the low-pressure column from heat exchangers 615 constitute the second heat exchange structures (corresponding to E2 shown in FIG. 1). Accordingly, heat is transferred from distillation column 603 (particularly, the rectifying section thereof) to low-pressure column 602 (particularly, the stripping section of the first distillation column). Each of heat exchangers 615 functions as a side reboiler provided in the first distillation column (low-pressure column 602), and also functions as a side cooler provided in the second distillation column (distillation column 603).

Similarly, liquid withdrawal units 616 are provided respectively at two stages of distillation column 603 (particularly, the stripping section thereof) as described in detail in the first detailed example of the heat exchange structure. Tube-bundle-type heat exchangers 617 are also provided respectively corresponding to the liquid withdrawal units within high-pressure column 601 (particularly, the rectifying section of the first distillation column included in the high-pressure column). Liquids are withdrawn from respective liquid withdrawal units 616, heated in the corresponding heat exchangers 617, and returned to stages directly below respective liquid withdrawal units 616. Liquid withdrawal units 616, lines for transferring the liquids from the liquid withdrawal units to heat exchangers 617, heat exchangers 617, and lines for returning the fluids to the distillation column 603 from heat exchangers 617 constitute the first heat exchange structures (corresponding to E1 shown in FIG. 1). Accordingly, heat is transferred to distillation column 603 (particularly, the stripping section thereof) from high-pressure column 601 (particularly, the rectifying section of the first distillation column). Each of heat exchangers 617 functions as a side cooler provided in the first distillation column (high-pressure column 601), and also functions as a side reboiler provided in the second distillation column (distillation column 603).

Further, liquid sump units 618 and also tube-bundle-type heat exchangers 619 each provided so as to be dipped in the liquid in the liquid sump unit, as described in detail in the second detailed example of the heat exchange structure, are also provided at two stages of distillation column 603 (particularly, the stripping section thereof). It should be noted that the partition plate, and the third and fourth pipes described in the second detailed example are not employed here.

As described above, a part of the vapor withdrawn from the column top of high-pressure column 601 is divided into two streams, which join each other after respectively passing through heat exchangers 619, and transferred to drum 608.

Lines for directing the vapor from the column top of high-pressure column 601 to heat exchangers 619, heat exchangers 619, liquid sump units 618, and lines for returning the fluid discharged from heat exchangers 619 to the column top of high-pressure column 601 via drum 608 and pump 610 constitute the first heat exchange structures (corresponding to E1 shown in FIG. 1). That is, the heat of the rectifying section of the first distillation column is transferred to the stripping section of the second distillation column (distillation column 603). Heat exchangers 619 function as overhead condensers of the first distillation column, and also function as side reboilers of the second distillation column.

Table 2 shows the column top operating pressures, the utility cooling loads, the utility heating loads, and the electricity consumptions of the first and second distillation columns, and also shows the total utility cooling load, the total utility heating load, and the total electricity consumption. Here, the utility cooling load means a cooling load by utilities, and more specifically, the amount of heat removed from a distillation apparatus by cooling water in an overhead condenser(s). The utility heating load means a heating load by utilities, and more specifically, the amount of heat applied to the distillation apparatus by steam (denoted by "STM" in the drawings) in a reboiler(s).

Regarding the first distillation column, the utility cooling load is specifically the amount of heat exchange in heat exchanger 609. Although heat exchangers 606 and 619 also function as the overhead condensers, it is not required to remove heat to the outside since the cooling is performed using a fluid present within the distillation apparatus in each of these heat exchangers, and therefore, their utility cooling loads are zero. In the reboiler (heat exchanger 606) of the first distillation column, since a fluid present in the distillation column is used as the heating source, it is not required to heat the reboiler from the outside, and therefore, its utility heating load is zero. The electricity consumption is electricity consumed in compressor 604. As the electricity consumption, a value including a mechanical loss (electricity required for compression is multiplied by 1.07) is shown (the same applies to other examples).

Regarding the second distillation column, the utility cooling load is the amount of heat removed from the distillation apparatus in the overhead condenser (specifically, the amount of heat exchange in heat exchanger 611). In the reboiler of the second distillation column, since a fluid present within the distillation column is used as the heating source, it is not required to heat the reboiler from the outside, and therefore, its utility heating load is zero. Since the second distillation column is a conventional distillation column, no compressor is provided, and therefore, its electricity consumption is zero.

In the example and comparative examples, each of the pumps for pumping liquid has only to increase the pressure by an amount corresponding to a pressure loss in piping and/or a lifting height for transferring liquid from a lower position to a higher position. Therefore, power consumption of the pumps is sufficiently smaller than that of the compressors. Therefore, the power consumption of the pumps is disregarded.

An energy saving index ESI is an index indicating how much the total utility heating load and the total electricity consumption (a value obtained by converting consumed electricity to primary energy; the value converted to primary energy=electricity/0.366) have been reduced with respect to those of the 1-butene process (Comparative Example 3) in which two conventional distillation columns are used.

Comparative Example 1

Figure 7:
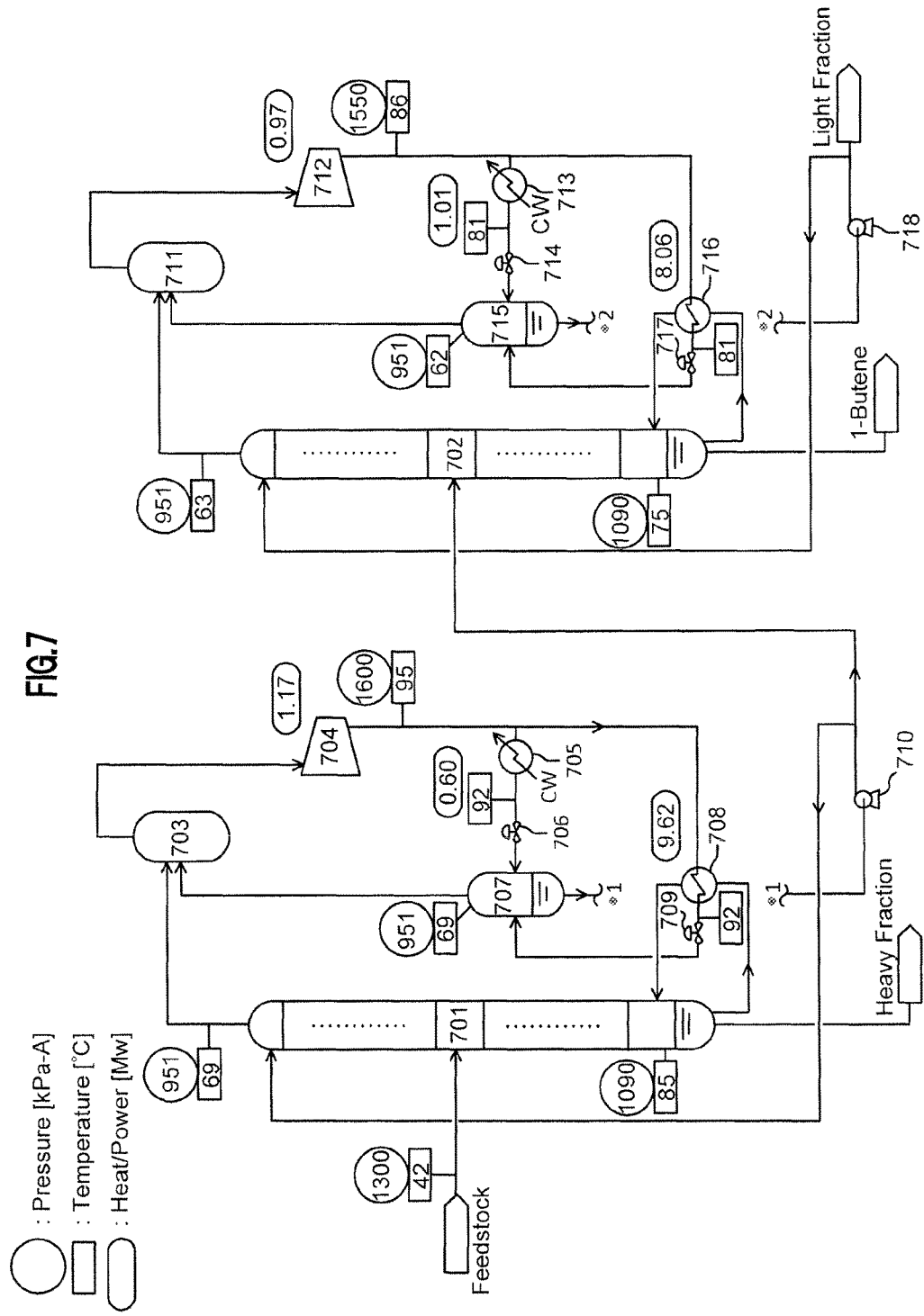
FIG. 7 is a process flow diagram of Comparative Example 1.

Heat and material balance was calculated for a distillation apparatus that has a configuration shown in FIG. 7 and that performs a 1-butene process. This distillation apparatus includes two distillation columns, i.e., first distillation column 701 and second distillation column 702, each of which is a VRC. The basic process flow of this distillation apparatus is described in the above-described pamphlet from Sulzer Chemtech.

The same feedstock supplied to the distillation apparatus and the same fractions (product 1-butene, heavy fraction, light fraction) discharged from the distillation apparatus, as those of Example 1 (shown in Table 1) were employed.

The feedstock is supplied to first distillation column 701. A vapor withdrawn from its column top is transferred to drum 703. The vapor from drum 703 is pressurized and increased in temperature in compressor 704. A part of the pressurized vapor is cooled in heat exchanger 705, and transferred to drum 707 via valve 706. The rest of the vapor pressurized in the compressor is cooled in heat exchanger 708, and transferred to gas-liquid separation drum 707 via valve 709. The vapor from drum 707 is returned to drum 703. The liquid from drum 707 is transferred to pump 710. A part of the outlet liquid of the pump is returned to the column top of first distillation column 701, and the rest is supplied to second distillation column 702. A part of a liquid withdrawn from the column bottom of the first distillation column is discharged from the distillation apparatus as a heavy fraction, and the rest is heated in heat exchanger 708, and returned to the column bottom of the first distillation column. Heat exchangers 705 and 708 function as overhead condensers of the first distillation column, and heat exchanger 708 also functions as a reboiler of the first distillation column.

A vapor withdrawn from the column top of the second distillation column is transferred to drum 711. The vapor from drum 711 is pressurized in compressor 712. A part of the pressurized vapor is cooled in heat exchanger 713, and transferred to drum 715 via valve 714. The rest of the pressurized vapor is cooled in heat exchanger 716, and transferred to drum 715 via valve 717. The vapor from drum 715 is returned to drum 711. The liquid from drum 715 is transferred to pump 718. A part of the outlet liquid of the pump is returned to the column top of second distillation column 702, and the rest is discharged from the distillation apparatus as a light fraction. A part of a liquid withdrawn from the column bottom of the second distillation column is discharged from the distillation apparatus as product 1-butene, and the rest is heated in heat exchanger 716, and returned to the column bottom of the second distillation column. Heat exchangers 713 and 716 function as overhead condensers of the second distillation column, and heat exchanger 716 also functions as a reboiler of the second distillation column.

Table 2 shows the column top operating pressures, the utility cooling loads, the utility heating loads, and the electricity consumptions of the first and second distillation columns, and also shows the total utility cooling load, the total utility heating load, and the total electricity consumption. Table 2 further shows the energy saving index ESI.

Regarding the first distillation column, the utility cooling load is specifically the amount of heat exchange in heat exchanger 705. Although heat exchanger 708 also functions as the overhead condenser, it is not required to remove heat to the outside since the cooling is performed using a fluid present within the distillation apparatus in this heat exchanger, and therefore, its utility cooling load is zero. In the reboiler (heat exchanger 708) of the first distillation column, since a fluid present within the distillation column is used as the heating source, it is not required to heat the reboiler from the outside, and therefore, its utility heating load is zero. The electricity consumption is electricity consumed in compressor 704.

Regarding the second distillation column, the utility cooling load is the amount of heat removed from the distillation apparatus in the overhead condenser (specifically, the amount of heat exchange in heat exchanger 713). Although heat exchanger 716 also functions as the overhead condenser, it is not required to remove heat to the outside since the cooling is performed using a fluid present within the distillation apparatus in this heat exchanger, and therefore, its utility cooling load is zero. In the reboiler of the second distillation column, since a fluid present within the distillation column is used as the heating source, it is not required to heat the reboiler from the outside, and therefore, its utility heating load is zero. The electricity consumption is electricity consumed in compressor 712.

Comparative Example 2

Figure 8:
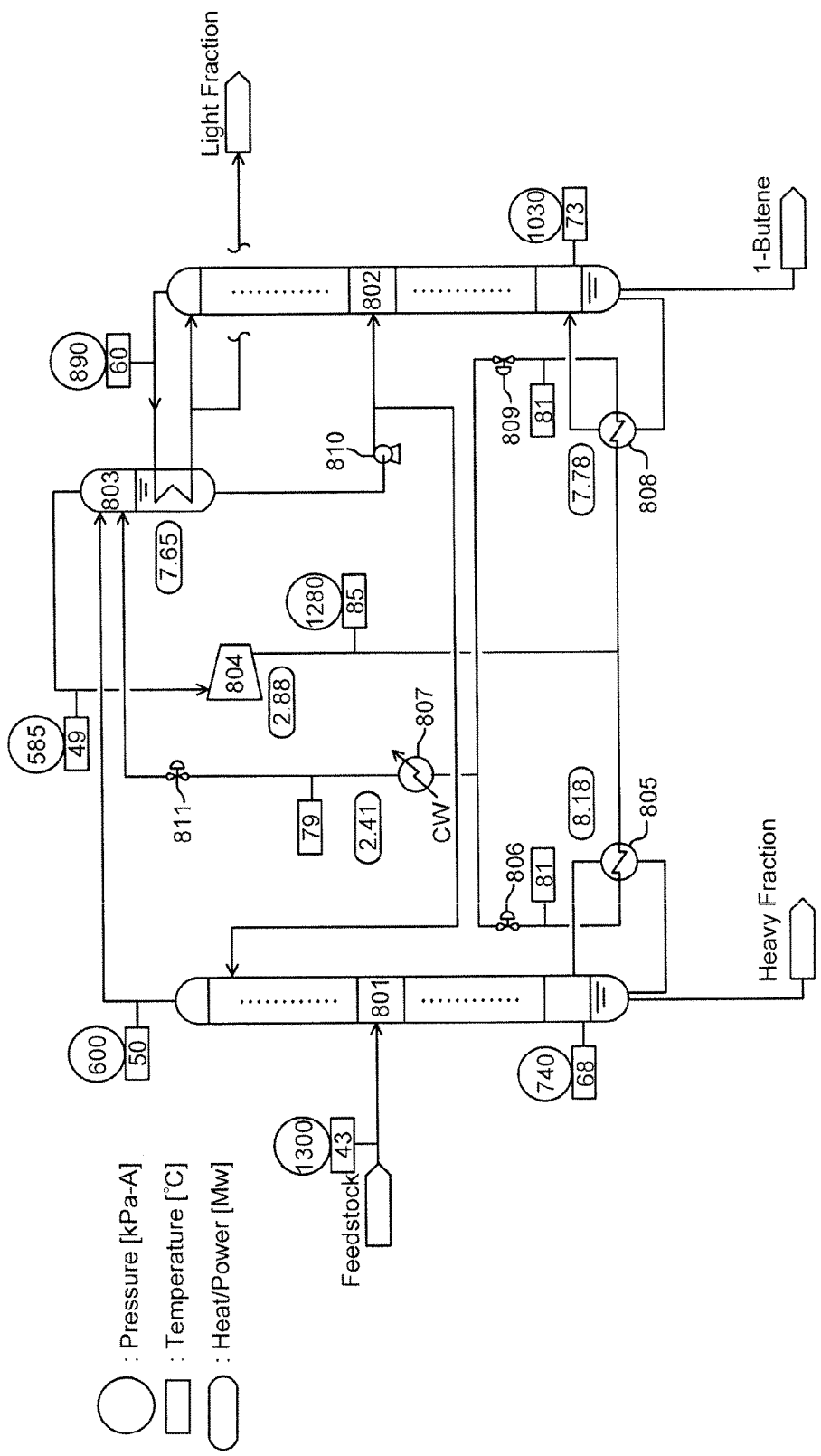
FIG. 8 is a process flow diagram of Comparative Example 2.

Heat and material balance was calculated for a distillation apparatus that has a configuration shown in FIG. 8 and that performs a 1-butene process. This distillation apparatus includes two distillation columns, i.e., a first distillation column and a second distillation column, and a single compressor. The outlet fluid of the compressor is used as a heat source of each reboiler of the two distillation columns. The basic process flow of this distillation apparatus is described in the above-described pamphlet from Sulzer Chemtech.

The same feedstock supplied to the distillation apparatus and the same fractions (product 1-butene, heavy fraction, light fraction) discharged from the distillation apparatus, as those of Example 1 (shown in Table 1) were employed.

The feedstock is supplied to first distillation column 801. A vapor is transferred to gas-liquid separation drum 803 from the column top of the first distillation column. The vapor from drum 803 is pressurized and increased in temperature in compressor 804. A part of the pressurized vapor is cooled in heat exchanger 805, passed through valve 806, and cooled in heat exchanger 807. The rest of the pressurized vapor is cooled in heat exchanger 808, passed through valve 809, and cooled in heat exchanger 807. The fluid from heat exchanger 807 is returned to drum 803 via valve (pressure regulating valve) 811. The liquid from drum 803 is transferred to pump 810. A part of the outlet liquid of the pump is supplied to second distillation column 802, and the rest is returned to the column top of first distillation column 801. A part of a liquid withdrawn from the column bottom of first distillation column 801 is discharged from the distillation apparatus as a heavy fraction, and the rest is heated in heat exchanger 805, and returned to the column bottom of first distillation column 801.

A vapor withdrawn from the column top of second distillation column 802 is cooled in a heat exchanger provided within drum 803. After that, a part thereof is returned to the column top of second distillation column 802, and the rest is discharged from the distillation apparatus as a light fraction. A part of a liquid withdrawn from the column bottom of the second distillation column is discharged from the distillation apparatus as product 1-butene, and the rest is heated in heat exchanger 808, and returned to the column bottom of the second distillation column.

Heat exchangers 805, 808, and 807 function as overhead condensers of the first distillation column. Heat exchanger 805 functions as a reboiler of the first distillation column, and heat exchanger 808 functions as a reboiler of the second distillation column. Drum 803 (particularly, the heat exchanger provided inside this drum) functions as an overhead condenser of the second distillation column.

Table 2 shows the column top operating pressures, the utility cooling loads, the utility heating loads, and the electricity consumptions of the first and second distillation columns, and also shows the total utility cooling load, the total utility heating load, and the total electricity consumption. Table 2 further shows the energy saving index ESI.

Regarding the first distillation column, the utility cooling load is the amount of heat removed from the distillation apparatus in the overhead condenser. The utility cooling load is specifically the amount of heat exchange in heat exchanger 807. Although heat exchangers 805 and 808 also function as the overhead condensers, it is not required to remove heat to the outside since the cooling is performed using a fluid present within the distillation apparatus in each of these heat exchangers, and therefore, their utility cooling loads are zero. In the reboiler (heat exchanger 805) of the first distillation column, since a fluid present within the distillation column is used as the heating source, it is not necessary to heat the reboiler from the outside, and therefore, its utility heating load is zero. The electricity consumption is electricity consumed in compressor 804.

Regarding the second distillation column, the utility cooling load is zero since the cooling is performed using a fluid present within the distillation apparatus in the overhead condenser. The utility heating load is also zero since a fluid present in the distillation column is used as the heating source in the reboiler. Since no compressor is provided in the second distillation column, the electricity consumption is zero.

Comparative Example 3

Figure 9:
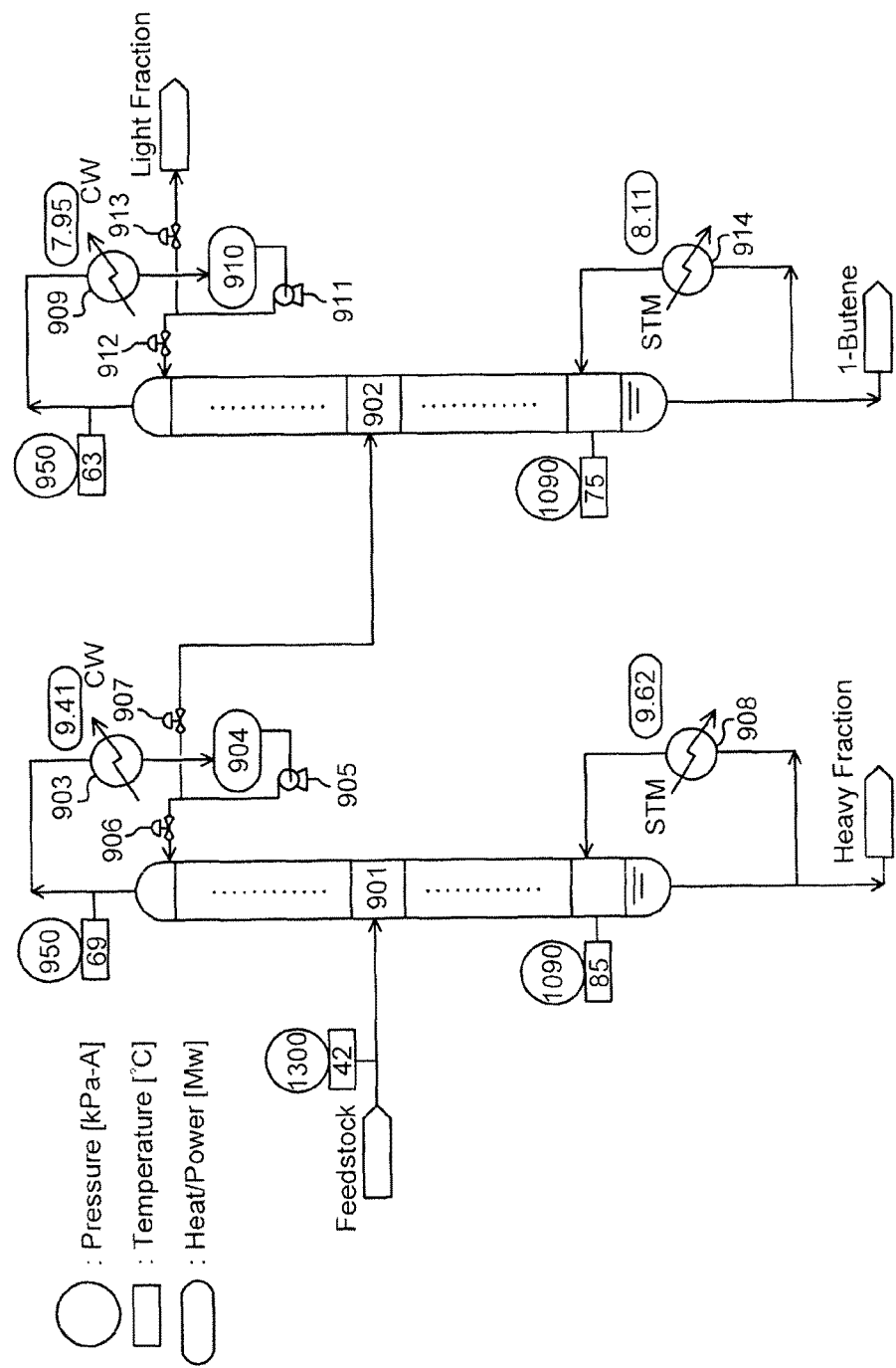
FIG. 9 is a process flow diagram of Comparative Example 3.

Heat and material balance was calculated for a distillation apparatus that has two conventional distillation columns as shown in FIG. 9 and that performs a 1-butene process.

This distillation apparatus has two distillation columns, i.e., first distillation column 901 and second distillation column 902, each of which is a conventional distillation column. The basic process flow of this distillation apparatus is described in the above-described pamphlet from Sulzer Chemtech.

The same feedstock supplied to the distillation apparatus and the same fractions (product 1-butene, heavy fraction, light fraction) discharged from the distillation apparatus, as those of Example 1 (shown in Table 1) were employed.

The feedstock is supplied to first distillation column 901. A vapor discharged from the column top of the first distillation column is cooled by cooling water and fully condensed in heat exchanger (overhead condenser) 903. The condensed liquid is directed to pump 905 via drum 904. A part of the outlet liquid of the pump is returned to the column top of the first distillation column via valve 906 as a reflux, and the rest of the pump outlet liquid is supplied to the second distillation column via valve 907 as a feedstock. A part of a liquid withdrawn from the column bottom of the first distillation column is discharged from the distillation apparatus as a heavy fraction, and the rest is heated by steam in heat exchanger (reboiler) 908, and returned to the column bottom of the first distillation column.

A vapor withdrawn from the column top of the second distillation column is cooled by cooling water and fully condensed in heat exchanger (overhead condenser) 909. The condensed liquid is directed to pump 911 via drum 910. A part of the outlet liquid of the pump is returned to the column top of the second distillation column via valve 912 as a reflux, and the rest of the pump outlet liquid is discharged from the distillation apparatus via valve 913 as a light fraction. A part of a liquid withdrawn from the column bottom of the second distillation column is discharged from the distillation apparatus as product 1-butene, and the rest is heated by steam in heat exchanger (reboiler) 914, and returned to the column bottom of the second distillation column.

Table 2 shows the column top operating pressures, the utility cooling loads, the utility heating loads, and the electricity consumptions of the first and second distillation columns, and also shows the total utility cooling load, the total utility heating load, and the total electricity consumption. Since the energy saving index ESI is calculated based on the present example, the value of ESI in the present example is zero.

Regarding the first distillation column, the utility cooling load is the amount of heat removed from the distillation apparatus in overhead condenser 903. The utility heating load is the amount of heat applied to the distillation apparatus in reboiler 908. Since no compressor is provided in the first distillation column, the electricity consumption is zero.

Regarding the second distillation column, the utility cooling load is the amount of heat removed from the distillation apparatus in overhead condenser 909. The utility heating load is the amount of heat applied to the distillation apparatus in reboiler 914. Since no compressor is provided in the second distillation column, the electricity consumption is zero.

As is understood from Table 2, in Example 1, the energy can be significantly reduced by about 70% as compared with Comparative Example 3. Although the energy can be reduced in Comparative Example 1 at a level slightly lower than that of Example 1, the cost is higher than that of Example 1 (one compressor is used) since two compressors are used in Comparative Example 1. In Comparative Example 2, only one compressor is used, but the energy reduction is significantly small.

Accordingly, it is understood that the present invention can achieve energy saving while controlling the cost increase.

TABLE 1

| Flow | Feedstock | Heavy fraction | Light fraction | 1-butene |
|---|---|---|---|---|
| Total mass flow rate [kg/h] | 14116 | 5908 | 364 | 7844 |
| Total molar flow rate [kmol/h] | 250.4 | 104.2 | 6.4 | 139.8 |
| Molar fraction [—] | | | | |
| C1 component | 0.0001 | 0 | 0.0031 | 0 |
| C3 components | 0.0013 | 0 | 0.0501 | 0 |
| Isobutane | 0.0204 | 0 | 0.7718 | 0.0013 |
| Isobutene | 0.0003 | 0 | 0.0007 | 0.0005 |
| 1-butene | 0.5649 | 0.0110 | 0.1743 | 0.9957 |
| Normal butane | 0.1079 | 0.2584 | 0 | 0.0005 |
| trans-2-butene | 0.1823 | 0.4353 | 0 | 0.0019 |
| cis-2-butene | 0.1215 | 0.2918 | 0 | 0 |
| Isopentane | 0.0000 | 0.0001 | 0 | 0 |

TABLE 1-continued

| Flow | Feedstock | Heavy fraction | Light fraction | 1-butene |
|---|---|---|---|---|
| 1-pentene | 0.0014 | 0.0033 | 0 | 0 |
| cis-2-pentene | 0.0000 | 0.0001 | 0 | 0 |

TABLE 2

| | | | Example 1 | Comp. Example 1 | Comp. Example 2 | Comp. Example 3 |
|---|---|---|---|---|---|---|
| First distillation column | Pressure | kPaA | 2050/900 | 950 | 600 | 950 |
| | Utility cooling load | MW | 0.21 | 0.60 | 2.41 | 9.41 |
| | Utility heating load | MW | 0 | 0 | 0 | 9.619 |
| | Electricity consumption (including mechanical loss) | kW | 2,011 | 1,171 | 2,878 | 0 |
| Second distillation column | Pressure | kPaA | 1550 | 950 | 890 | 950 |
| | Utility cooling load | MW | 1.11 | 1.01 | 0 | 7.95 |
| | Utility heating load | MW | 0 | 0 | 0 | 8.11 |
| | Electricity consumption (including mechanical loss) | kW | 0 | 970 | 0 | 0 |
| Total | Utility cooling load | MW | 1.32 | 1.62 | 2.41 | 17.35 |
| | Utility heating load | MW | 0 | 0 | 0 | 17.73 |
| | Electricity consumption (including mechanical loss) | kW | 2,011 | 2,141 | 2,878 | 0 |
| Energy saving index (ESI) | | % | 69.0 | 67.0 | 55.6 | 0 |

ESI [%] = {1 − ($Q_{RH}$ + $W_H$/0.366)/$Q_{RC}$} × 100
$Q_{RH}$: total utility heating load [MW]
$W_H$: total electricity consumption [MW]
$Q_{RC}$: total utility heating load in Comparative Example 3 [MW]

EXPLANATION OF LETTERS OR NUMERALS

A: first distillation column
B, C: second distillation column
A1: high-pressure column included in the first distillation column
A2: low-pressure column included in the first distillation column
A3: vapor line
A4: pressurizing means
A5: liquid line
A6, B6, C6: overhead condenser
A7, B7, C7: reboiler
B1, C1: column body (vessel)
1, 4: chimney tray for sump
2: tube-bundle-type heat exchanger
2a: lower tube portion
2b: upper tube portion
3: chimney tray for sump
10, 12, 14: liquid
11, 13, 15: vapor
21, 22, 23, 24: pipe
601: high-pressure column included in the first distillation column
602: low-pressure column included in the first distillation column
603, 702, 802, 902: second distillation column
604, 704, 712, 804: compressor
605, 606, 609, 611, 705, 708, 713, 716, 805, 807, 808, 903, 908, 909, 914: heat exchanger
607, 610, 613, 710, 718, 810, 905, 911: pump
608, 612, 703, 707, 711, 715, 803, 904, 910: drum
614, 616: liquid withdrawal unit
615, 617, 619: tube-bundle-type heat exchanger
618: liquid sump unit
701, 801, 901: first distillation column
706, 709, 714, 717, 806, 809, 811, 906, 907, 912, 913: valve

What is claimed is:

1. A distillation apparatus, comprising a first distillation column and one or more additional distillation columns, wherein
the first distillation column comprises:
a higher-pressure part including the whole or a part of a rectifying section and configured to perform gas-liquid contact at an operation pressure higher than that of a lower-pressure part;
the lower-pressure part including the whole or a part of a stripping section and configured to perform gas-liquid contact at an operating pressure lower than that of the higher-pressure part;
a vapor line, including a compressor, for directing a vapor discharged from a column top of the lower-pressure part to a column bottom of the higher-pressure part; and
a liquid line for directing a liquid discharged from the column bottom of the higher-pressure part to the column top of the lower-pressure part, and wherein
the distillation apparatus further comprises:
a heat exchange structure 'E1' configured to transfer heat from the rectifying section of the first distillation column to at least one of the one or more additional distillation columns by heat exchange; and a heat exchange structure 'E2' configured to transfer heat from at least one of the one or more additional distillation columns to the stripping section of the first distillation column by heat exchange.

2. The distillation apparatus according to claim 1, wherein the at least one of the one or more additional distillation columns that receives heat from the rectifying section of the first distillation column via the heat exchange structure 'E1' and the at least one of the one or more additional distillation columns that gives heat to the stripping section of the first distillation column via the second heat exchange structure 'E2' are the same at least one of the one or more additional distillation columns.

3. The distillation apparatus according to claim 2, comprising a line for connecting a column top of the higher-pressure part of the first distillation column or a column bottom of the lower-pressure part of the first distillation column to a feedstock inlet of the at least one of the one or more additional distillation columns.

4. The distillation apparatus according to claim 3, wherein the distillation apparatus is equipped with a single first distillation column and a single additional distillation column, and comprises a line for connecting the column top of the higher-pressure part of the first distillation column to the feedstock inlet of the additional distillation column, and wherein the distillation apparatus is configured so that a feedstock containing 1-butene, a component lighter than 1-butene, and a component heavier than 1-butene is supplied to the first distillation column, and a fraction enriched in the component heavier than 1-butene is discharged from the column bottom of the lower-pressure part of the first distillation column, and a fraction enriched in 1-butene and the component lighter than 1-butene is discharged from the column top of the higher-pressure part of the first distillation column, and supplied to the additional distillation column, and a fraction enriched in 1-butene is discharged from a column bottom of the second additional distillation column, and a fraction further enriched in the component lighter than 1-butene is discharged from a column top of the additional distillation column.

5. The distillation apparatus according to claim 1, comprising a line for connecting a column top of the higher-pressure part of the first distillation column or a column bottom of the lower-pressure part of the first distillation column to a feedstock inlet of the at least one of the one or more additional distillation columns.

* * * * *

UNITED STATES PATENT AND TRADEMARK OFFICE
CERTIFICATE OF CORRECTION

PATENT NO. : 9,851,140 B2
APPLICATION NO. : 14/548823
DATED : December 26, 2017
INVENTOR(S) : Toshihiro Wakabayashi Page 1 of 1

It is certified that error appears in the above-identified patent and that said Letters Patent is hereby corrected as shown below:

In the Claims

In Column 25 at Line 11 (approx.), in Claim 2, after "the" delete "second".

In Column 26 at Line 15 (approx.), in Claim 4, after "the" delete "second".

Signed and Sealed this
Eighth Day of May, 2018

Andrei Iancu
*Director of the United States Patent and Trademark Office*